Nov. 22, 1949     J. G. SOLA     2,489,245
ELECTRICAL APPARATUS
Filed March 21, 1946
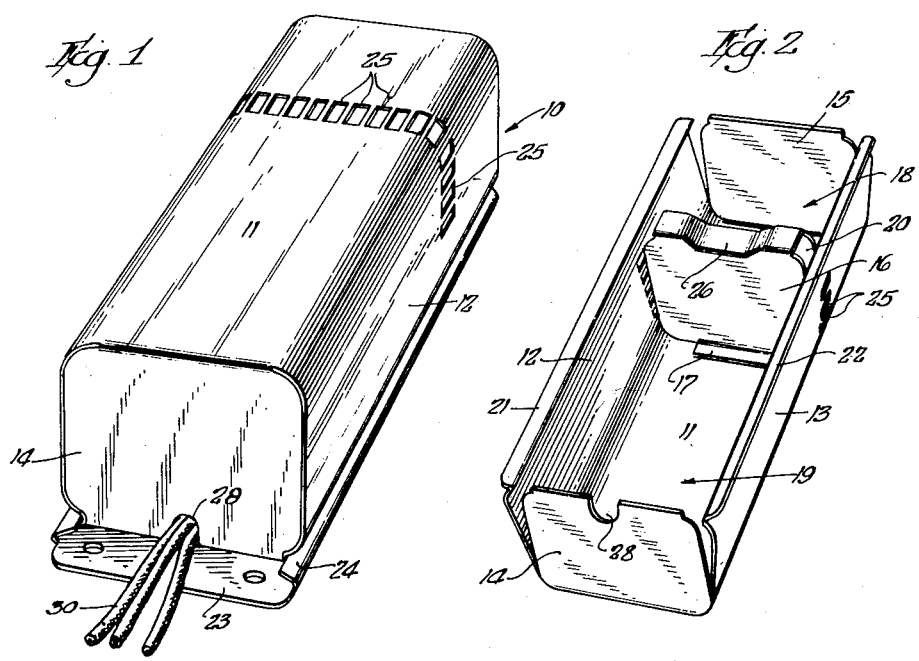
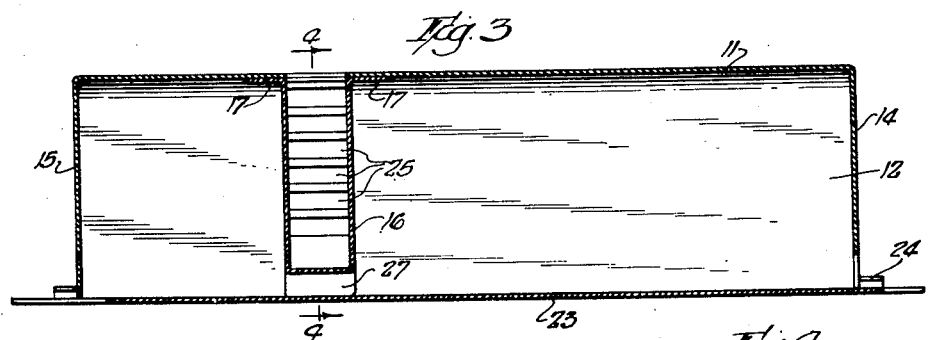
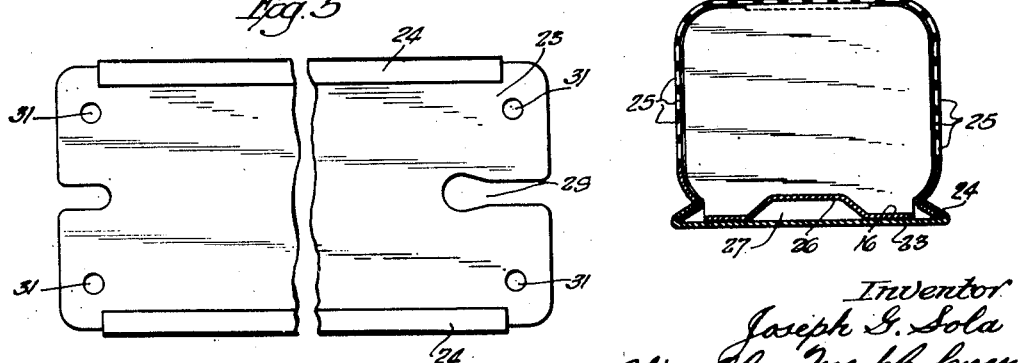
Inventor
Joseph G. Sola Patented Nov. 22, 1949

2,489,245

UNITED STATES PATENT OFFICE 2,489,245

ELECTRICAL APPARATUS

Joseph G. Sola, River Forest, Ill., assignor, by mesne assignments, to Chicago Title and Trust Company, Chicago, Ill., a corporation of Illinois, trustee Application March 21, 1946, Serial No. 655,962

10 Claims. (Cl. 220—3.2)

This invention relates to electrical apparatus, more particularly to housings or enclosing casings for electrical apparatus such as transformers or similar static energy-translating devices, and the invention has for an object the provision of improved housings or casings of this character.

Although enclosing casings or housings embodying the present invention are not limited thereto, they are particularly adapted for enclosing constant voltage transformers and regulators of the type described and claimed in my prior Patents No. 2,143,745, issued January 10, 1939, and No. 2,346,621, issued April 11, 1944, which transformers and regulators comprise one or more core-and-coil units and one or more condensers or capacitor units. Static energy-translating device, such as condensers or transformer core-and-coil units, particularly condensers, are designed to operate within certain ambient temperature limits, and difficulties may be encountered in attempting to house or enclose a plurality of such units within the same enclosing casing due to the fact that the temperature rise produced in the core-and-coil unit, for example during operation thereof, may cause excessive heating and eventual failure of the condenser unit. This is particularly true in connection with lighting installations of the type disclosed in my said prior Patent No. 2,346,621, wherein the size and appearance of the enclosing casing for the energizing unit supplying energy to the lamps is of primary importance. Accordingly, it is a further object of this invention to provide a compact unitary housing for a plurality of energy-translating devices of the character above indicated, wherein the separate devices are substantially thermally isolated and heat transfer therebetween during operation is minimized even though the separate devices are disposed closely adjacent each other.

In carrying out the invention in one form I provide a housing for a pair of static energy-translating devices, such for example as a core-and-coil unit and a condenser unit, comprising a metallic casing enclosing both of said devices and having a hollow, double-walled partition dividing the housing into a pair of device-receiving compartments separated by a ventilating compartment, the walls of the casing having a row of apertures therein communicating with the ventilating compartment on at least two sides thereof to permit circulation of air through the hollow partition and minimize heat transfer between the translating-device compartments.

For a more complete understanding of the invention, reference should now be had to the drawing in which:

Fig. 1 is a perspective view of a housing or casing for electrical apparatus embodying the present invention;

Fig. 2 is an inverted perspective view showing the interior of the housing or casing, the bottom wall being removed.

Fig. 3 is a longitudinal sectional view taken substantially along the centerline of the housing shown in Fig. 1 but with the energy-translating devices removed.

Fig. 4 is a transverse sectional view taken substantially along the line 4—4 of Fig. 3; and Fig. 5 is a plan view looking at the interior of the bottom wall of the casing shown in Figs. 1, 3 and 4.

Referring now to the drawing, the invention is shown as embodied in a housing or casing 10 comprising a one-piece metallic casing shaped to provide a top wall 11 having unitary downwardly extending side walls 12 and 13 and end walls 14 and 15. Disposed within the one-piece casing is a U-shaped partition member 16, the free upper ends of which are provided with outturned flanges 17 adapted to be welded or similarly secured to the top wall 11 of the casing so as to divide the casing into a pair of spaced-apart device-receiving compartments 18 and 19 separated by a ventilating compartment 20, which latter compartment constitutes the interior of the hollow partition member 16.

As shown best in Fig. 2, the one-piece casing is so formed that the side walls 12 and 13 normally occupy positions outwardly from the edges of the end walls 14 and 15 and the partition member 16, the lower edges of the side walls 12 and 13 being provided with outwardly extending flanges 21 and 22 respectively. The bottom wall of the housing or casing 10 comprises a flat sheet of metal 23 (Fig. 5) which is provided along opposite edges with inturned flanges 24 which are adapted to telescope over the flanges 21 and 22 of the side walls 12 and 13 when these side walls have been forced inwardly toward each other, the bottom wall thereby serving to hold the side walls in tight engagement with the end walls 14 and 15 and the hollow partition member 16.

In order to provide for thermal isolation of the device-receiving compartments 18 and 19 the side walls 12 and 13 and the top wall 11 of the housing or casing 10 are provided with a plurality of spaced-apart apertures 25 which communicate with the interior of the hollow partition member 18 and permit the circulation of air therethrough, thus minimizing the transfer of heat transversely of the partition member.

Electrical interconnection of the respective devices disposed in the compartments 18 and 19 is facilitated by forming in the yoke portion of the hollow partition member 16 a suitable indentation 26 which together with the bottom wall 23 of the housing defines a conductor-receiving channel or passageway 27 (Fig. 4) extending between the two compartments. Likewise, connection of the energy-translating devices to external circuits is facilitated by providing in the end wall 14 a suitable conductor-receiving aperture 28 and by providing the bottom wall 23 with a cooperating slot or aperture 29 whereby the conductors may be brought out through the end of the casing, as shown best in Fig. 1, the conductors 30 therein extending through the aperture 28, or, if desired, by leading the conductors out through the slot 29 in the bottom wall. As shown in Figs. 1 and 5, the bottom wall 23 is preferably provided with suitable apertures 31 adjacent the opposite ends thereof for use in mounting the casing on a suitable support.

In assembling the energy-translating devices in the housing or casing 10, the condenser unit of the constant voltage regulator or transformer disclosed, for example, in my prior Patent No. 2,346,621 will be placed in the device-receiving compartment 18, the core-and-coil unit placed in the device-receiving compartment 19 and the desired electrical connections made therebetween with the connecting conductors nested in the recess 26 in the hollow partition 16. The casing 10 in inverted position may then be placed in a suitable die or clamp so as to compress the side walls 12 and 13 inwardly into tight engagement with the edges of the end walls and partition member, and the compartments 18 and 19 may then be filled with the usual insulating compound whereupon the bottom wall may be telescoped into position on the side walls with the respective flanges interengaged as shown best in Fig. 4. Upon removal of the casing from the die or clamp the bottom wall effectively retains the side walls in the desired compressed position and the completed unit is ready for testing and shipment.

In use it has been found that the provision of the ventilating compartment between the two device-receiving compartments renders the two devices substantially independent of the temperature conditions produced in the respective other compartment. In addition to the circulation of air through the hollow partition, the provision of the apertures 25 serves to reduce the amount of metal available for the conduction of heat between the compartments 18 and 19.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A housing for a pair of static energy-translating devices comprising a metallic casing enclosing both of said devices, and a double walled partition dividing said housing into a pair of device-receiving compartments separated by a ventilating compartment, said casing having a row of apertures in the walls thereof communicating with said ventilating compartment on at least two sides thereof to permit circulation of air therethrough and minimize heat transfer between said translating device-receiving compartments, said partition having a closed edge and having an indentation therein to provide a conductor-receiving space between said closed edge and the adjacent wall of said casing.

2. A housing for a pair of static energy-translating devices comprising a metallic casing enclosing both of said devices, and a double walled partition extending transversely of said casing intermediate the ends thereof to provide a pair of device-receiving compartments separated by a ventilating compartment, said partition having one closed edge and three open edges, said closed edge having a portion thereof spaced from the adjacent wall of said casing to provide a conductor-receiving channel extending between said device-receiving compartments; said casing having a row of apertures extending transversely around three sides thereof communicating with the open edges of said partition to permit circulation of air through said ventilating compartment and minimize heat transfer between said device-receiving compartments.

3. A housing for a pair of static electric-energy-translating devices which generate heat in normal use, comprising a metallic casing enclosing both devices, a U-shaped partition member having three open sides, and means securing said partition member to a wall of said casing in transverse relation with said open sides engaging adjacent walls of said casing, said walls having apertures therein communicating with the interior of said partition member to permit circulation of air therethrough thereby to minimize heat transfer through said partition longitudinally of said casing.

4. A housing for a pair of static electric-energy-translating devices comprising a metallic casing enclosing both devices, and a U-shaped member extending transversely of said casing to form a hollow partition dividing said casing into a plurality of device-receiving compartments separated by a ventilating compartment, said casing having apertures in the walls thereof communicating with the interior of said hollow partition to permit circulation of air through said ventilating compartment to minimize heat transfer between said device-receiving compartments.

5. A housing for a pair of static electric-energy-translating devices comprising a metallic casing enclosing both devices, and a U-shaped member extending transversely of said casing to form a hollow partition dividing said casing into a plurality of device-receiving compartments separated by a ventilating compartment, said casing having apertures in the walls thereof communicating with the interior of said hollow partition to permit circulation of air through said ventilating compartment to minimize heat transfer between said device-receiving compartments, the yoke of said U-shaped member having an indentation therein to provide a conductor-receiving space extending between said device-receiving compartments adjacent one wall of said casing.

6. A housing for a pair of static electric-energy-translating devices comprising a one piece metallic casing forming a top wall and downwardly extending side and end walls, a substantially U-shaped partition member extending transversely of said casing with the yoke portion of said U adjacent the open bottom of said casing and the free ends of said U secured to said top wall, said side walls having flanges along the respective lower edges, and a bottom wall member having side flanges adapted to telescope over said side-wall flanges to hold said side walls tightly in engagement with the side edges of said end walls and said partition member, said top and side walls having apertures therein communicating with the interior of said U-shaped partition member for ventilation of the space between the legs thereof whereby to minimize heat exchange between the portions of said casing on opposite sides of said partition member.

7. A housing for a pair of static electric-energy-translating devices comprising a one piece metallic casing forming a top wall and downwardly extending side and end walls, a substantially U-shaped partition member extending transversely of said casing with the yoke portion of said U adjacent the open bottom of said casing and the free ends of said U secured to said top wall, said partition member dividing said casing into a pair of device-receiving compartments separated by a ventilating compartment, said side walls having flanges along the respective lower edges, and a bottom wall member having side flanges adapted to telescope over said side-wall flanges to hold said side walls tightly in engagement with the side edges of said end walls and said partition member, said top and side walls having apertures therein communicating with the interior of said U-shaped partition member for permitting circulation of air through said ventilating compartment to minimize heat transfer between said device-receiving compartments.

8. A housing for a pair of static electric-energy-translating devices comprising a one piece metallic casing forming a top wall and downwardly extending side and end walls, a substantially U-shaped partition member extending transversely of said casing with the yoke portion of said U adjacent the open bottom of said casing and the free ends of said U secured to said top wall, said partition member dividing said casing into a pair of device-receiving compartments separated by a ventilating compartment, said side walls having flanges along the respective lower edges, and a bottom wall member having side flanges adapted to telescope over said side-wall flanges to hold said side walls tightly in engagement with the side edges of said end walls and said partition member, said top and side walls having apertures therein communicating with the interior of said U-shaped partition member for permitting circulation of air through said ventilating compartment to minimize heat transfer between said device-receiving compartments, said yoke portion of said partition member having an indentation therein for providing a conductor-receiving space between said yoke portion and said bottom wall extending from one to the other of said device-receiving compartments.

9. A housing for fluorescent lamp accessories which generate heat in normal use which must be dissipated, comprising a base plate, an open ended hood detachably secured to said base plate, a pair of walls closing the open ends of said hood, and a pair of intermediate walls relatively closely spaced and dividing the space within the hood into separate compartments in which said accessories are to be mounted, said hood being slotted in the region between said intermediate walls, whereby said intermediate walls act as radiators for the heat generated by the accessories which heat is dissipated by circulation through said slots.

10. In the combination of claim 9, said base plate having flanges at an opposite pair of edges and the adjacent edges of said hood having flanges slidably engaging the flanges on said base plate and all of said walls being integrally attached to said hood, whereby the hood and attached walls can be slidably disengaged from said base plate.

JOSEPH G. SOLA.

REFERENCES CITED

The following references are of record in the file of this patent:

UNITED STATES PATENTS

| Number | Name | Date |
| --- | --- | --- |
| 766,566 | Witt | Aug. 2, 1904 |
| 2,100,226 | Stenberg | Nov. 23, 1937 |
| 2,285,437 | Johannson | June 9, 1942 |
| 2,417,464 | Bayne | Mar. 18, 1947 |